United States Patent [19]

Stasch et al.

[11] Patent Number: 4,680,687
[45] Date of Patent: Jul. 14, 1987

[54] SWITCH-MODE POWER SUPPLY HAVING A FREE-RUNNING FORWARD CONVERTER

[75] Inventors: Harald Stasch, Neuried; Rudolf Schierjott, Munich, both of Fed. Rep. of Germany

[73] Assignee: Siemens Aktiengesellschaft, Berlin and Munich, Fed. Rep. of Germany

[21] Appl. No.: 750,146

[22] Filed: Jul. 1, 1985

[30] Foreign Application Priority Data

Aug. 7, 1984 [DE] Fed. Rep. of Germany ....... 3429103

[51] Int. Cl.$^4$ ........................................... H02M 3/335
[52] U.S. Cl. ...................................... 363/18; 363/131
[58] Field of Search ................... 363/18, 19, 20, 21, 363/97, 131

[56] References Cited

U.S. PATENT DOCUMENTS

| | | | |
|---|---|---|---|
| 2,920,259 | 1/1960 | Light | 363/18 |
| 3,618,130 | 11/1971 | Garuts | 363/21 |
| 3,935,526 | 1/1976 | Kamata et al. | 363/21 |
| 4,374,355 | 2/1983 | Steigerwald et al. | 363/21 |
| 4,410,936 | 10/1983 | Suzuki | 363/97 |
| 4,443,838 | 4/1984 | Yamada | 363/19 |
| 4,443,839 | 4/1984 | Onodera et al. | 363/20 |
| 4,498,128 | 2/1985 | Peterson et al. | 363/21 |
| 4,499,530 | 2/1985 | Onda et al. | 363/17 |
| 4,535,399 | 8/1985 | Szepesi | 363/97 |
| 4,566,060 | 6/1986 | Hocksma | 363/21 |
| 4,594,636 | 6/1986 | Hamer et al. | 323/289 |
| 4,612,610 | 9/1986 | Farnsworth et al. | 363/19 |
| 4,617,620 | 10/1986 | Speranza | 363/19 |

FOREIGN PATENT DOCUMENTS 2814848 10/1979 Fed. Rep. of Germany ........ 363/19

Primary Examiner—Peter S. Wong
Assistant Examiner—Judson H. Jones
Attorney, Agent, or Firm—Hill, Van Santen, Steadman & Simpson

[57] ABSTRACT

A switch-mode power supply has a rectifier for producing a small d.c. voltage from an input a.c. voltage, and a converter which comprises a switching transistor and a transformer. The converter arrangement is a free-running conductive converter and the switching transistor is switched on in the currentless state.

5 Claims, 1 Drawing Figure

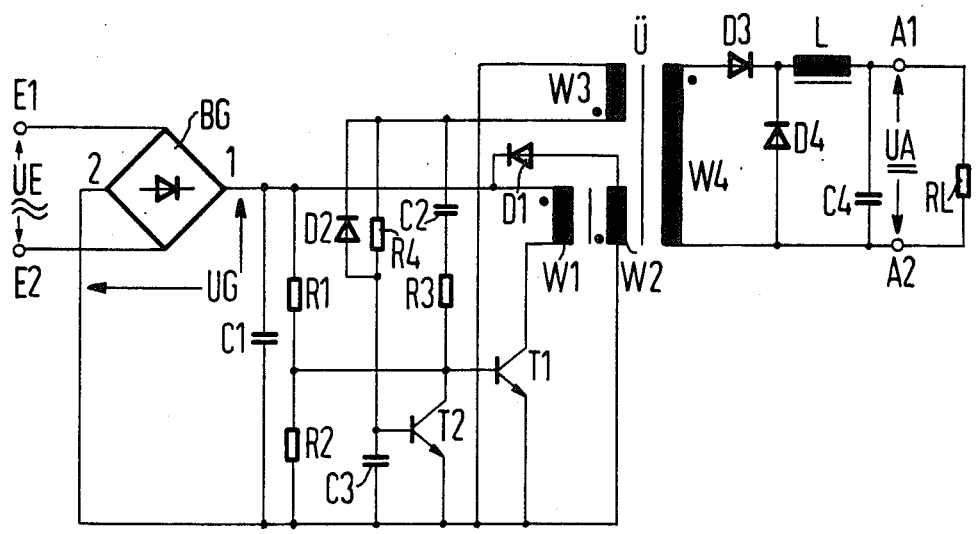

SWITCH-MODE POWER SUPPLY HAVING A FREE-RUNNING FORWARD CONVERTER

BACKGROUND OF THE INVENTION

1. Field of the Invention

The present invention relates to a switch-mode power supply in which a rectifier produces d.c. voltage from an input a.c. voltage and a converter is connected thereto for producing d.c. voltage.

2. Description of the Prior Art

Switch-mode power supplies are currently used on a large scale for current supply purposes as they are lighter, smaller and less expensive to produce than, for example, 50 Hz power supplies.

Generally known switch-mode power supplies consist of a transformer whose primary winding is charged with energy by a switching transistor and from whose secondary winding or windings this energy is withdrawn in the form of one or more than one constant voltage. Here, the transformer forms a part of a forward converter or a fryback converter. The construction and mode of operation of these types of converter are described in detail in the book "Schaltnetzteile" by Joachim Wüstehube, published in 1979 by Expert-Verlag, Chapter 2.1.

Switch mode power supplies generally operate in a frequency range of from 16 to 500 kHz. As the occurring current curves and voltage curves exhibit considerable overshoot components, and, in addition, it is necessary to switch high currents and voltages, considerable interference must be expected in the frequency range above 10 kHz (long wave). The frequency response of this interference is subject to binding regulations if propagation into public networks or radiation into the open are possible.

For the suppression of asymmetrical interference voltages in the networks, between their primary and secondary sides transformers in switch-mode power supplies are provided with a shielding. The shielding consists of, for example, a copper foil which is arranged in an insulated manner over the primary winding.

Fryback converter power supplies contain a transformer having an air gap. In particular at high powers, high eddy current losses may occur in the transformer cores of the transformers and in the shielding. Therefore, it is general practice (see Wüstehube) to use a so-called conductive fleece in place of a copper foil for shielding purposes. As a result, the production of such a transformer for a fryback converter is elaborate and expensive.

The known forward converters consist of periodically-operating switching transistors which are fundamentally controlled by a fixed timing pulse train, and a transformer without an air gap whose primary winding lies in the collector circuit of a switching transistor and from whose secondary winding a d.c. voltage can be obtained via a rectifier and inductance. Since a predetermined switching frequency is used in the case of this switching principle, the switch-on time of the switching transistor is predetermined. This switching principle has the disadvantage that a switching transistor is switched on in the presence of current and a free-wheeling diode in the secondary circuit assumes the blocked state in the presence of current. This leads to high radio interference voltages on the network line. If these converter circuits are used in text terminals of communications technology having electric isolation in accordance with the protection class 2, i.e. without ground conductors, it is not possible to shield these devices to the required radio interference level of Limit Value Class B.

SUMMARY OF THE INVENTION

The object of the present invention is to provide a switch-mode power supply having electric isolation, wherein only small interference pulses occur on the connection lines and which contains a transformer which is subject to low eddy current losses.

The above object is realized, according to the present invention, in a switch-mode power supply of the type initially set forth and which is characterized in that the converter is assigned as a free-running forward converter wherein the switching transistor is switched on in the currentless state.

An advantage of the switch-mode power supply constructed in accordance with the present invention consists in that converter can easily be shielded because of the triangular collector current.

The switching losses are reduced by virtue of the fact that the switching transistor is not switched on in the presence of current.

Since the switch-mode power supply constructed in accordance with the present invention contains a forward converter, a metal foil, which is simple to process, can be used to shield the primary winding of the transformer.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE showing a schematic circuit diagram of a switch-mode power supply constructed in accordance with the present invention.

DESCRIPTION OF THE PREFERRED EMBODIMENTS

The switch-mode power supply illustrated on the drawing comprises a forward converter having two input terminals E1, E2 to which an input alternating voltage UE is applied. A bridge rectifier BG converts this input alternating voltage UE into a d.c. voltage UG which is emitted from a pair of terminals 1, 2, where a potential is emitted from the terminal 1 which is positive in relation to the terminal 2. The d.c. voltage UG is smoothed by a capacitor C1 connected between the terminals 1 and 2. Also connected between the terminals 1 and 2 is a series arrangement of two resistors R1 and R2, and a series arrangement comprising a primary winding W1 of a transformer U and the collector-emitter path of a switching transistor T1. A voltage divider point (not referenced in detail) between the resistors R1 and R2 is connected to the base of the switching transistor T1.

The primary winding W1, a demagnetizing winding W2, a control winding W3 and a secondary winding W4 form portions of the transformer U. The primary winding W1 and the secondary winding W4 are each wound in the same direction, whereas the control winding W3 and the demagnetizing winding W2 are wound in the opposite direction. The demagnetizing winding W2 is connected, in series with a diode D1, between the terminals 1 and 2, where the cathode of the diode D1 is connected to the terminal 1.

The collector-emitter path of a control transistor T2 is connected between the base of the switching transistor T1 and the terminal 2. The base of the control transistor T2 is connected to the terminal 2 by way of a capacitor C3 and via a series arrangement of a resistor R4 and a control winding W3 is also connected to the terminal 2. The resistor R4 is connected in parallel to a diode D2 whose anode is connected to the base of the control transistor T2. The cathode of the diode D2 is connected to the base of the switching transistor T1 via a series arrangement of a capacitor C2 and a resistor R3.

Together with the capacitor C2, the resistor R3 forms a switch-on stage, and the capacitor C3, with the resistor R4 and the control transistor T2 and the diode D2, forms a switch-off stage for the switching transistor T1. One end of the secondary winding W4 is connected to an output terminal A1 via a rectifier diode D3 and an inductance L. The other end of the secondary winding W4 is directly connected to an output terminal A2 which is connected to the cathode of a rectifier D3 via a free-wheeling diode D4 which is poled in the flow direction. In order to smooth an output d.c. voltage UA which can be tapped from the output terminals A1, A2, a capacitor C4 is connected between these terminals. Also connected between the output terminals A1 and A2 is a load resistor RL which symbolically represents external load circuits.

The mode of operation of the switch-mode power supply constructed in accordance with the present invention is described below.

The rectified input alternating voltage UE, i.e. the d.c. voltage UG, is converted into a timing pulse-controlled voltage by the primary winding W1 of the transformer U and the switching transistor T1. When the switch-mode power supply is switched on, the capacitor C2 is charged via the resistors R1 and R3 and via the control winding W3. When a threshold voltage is reached across the base of the switching transistor T1, the transistor T1 is switched conductive and the forward converter begins operation.

During the conductive phase of the switching transistor T1, energy is transferred to the secondary side of the transformer U. At the same time, the rectifier diode D3 is conductive and the free-wheeling diode D4 is blocked. A current flowing through the inductance L permits the output d.c. voltage UA to be obtained from the capacitor C4. While the current is flowing, not only does the load resistor RL absorb energy, but also the inductance L by which it is stored as magnetic energy. The peak value of the current in the primary circuit is determined by the inductance L, by the sum of the resistance losses in the primary and secondary circuits, by the switch-on duration of the switching transistor T1, and by the value of the output d.c. voltage UA.

Also during the conductive phase of the switching transistor T1, at the primary side of the transformer U, the capacitor C3 is charged, via the resistor R4, by the current in the control winding W3. When the capacitor C3 has charged to the threshold voltage of the base of the control transistor T2, the transistor T2 is switched conductive in a pulse manner and the switching transistor T1 is blocked. Therefore, the switch-on duration of the switching transistor T1 is fundamentally governed by the time constant formed by the resistor R4 and the capacitor C3. During the blocked phase of the switching transistor T1, the base of the transistor T1 is connected to a negative voltage, relative to the potential which can be tapped from the terminal 2 of the bridge rectifier BG. This voltage reversal across the base of the switching transistor T1 is produced by the reversal of the voltage which can be tapped from the control winding W3. The blocking process in the switching transistor is initiated via the control transistor T2 and is maintained during the demagnetization via the control winding W3.

During the blocked phase of the switching transistor T1, on the secondary side of the transformer U the diode D3 is poled in the reverse direction and it is therefore not conductive. As a result of the energy stored in the inductance L, the current flows through the inductance, through the load resistor RL and through the nonconductive free-wheeling diode D4 in the same direction.

During the blocked phase of the switching transistor T1, the magnetic energy which has been stored by the transformer core of the transformer U during the conductive phase of the switching transistor flows back via the demagnetization winding W2 and the diode D1, in the form of electrical current, into the voltage source, i.e. into the capacitor C1. Following the demagnetization of the transformer U and in the currentless state of the free-wheeling diode D4, the switching transistor T1 is again switched conductive. The negative voltage which is connected to the base of the switching transistor T1 during its blocked phase disintegrates following the demagnetization. By way of the resistor R3 and the control winding W3, the capacitor C2 is charged again and the switching transistor T1 is switched conductive again. The diode D2 serves to suddenly discharge the capacitor C3 at the beginning of the blocked phase of the switching transistor T1.

The principle upon which the switch-mode power supply of the present invention is based is that the switchon time of the switching transistor T1, and thus its switching frequency, are not predetermined. Following the demagnetizaticn of the transformer U and in the currentless state of the free-wheeling diode D4, the switching transistor T1 is automatically switched on again. This ensures that the switching transistor T1 is not switched on in the presence of current and that a triangular collector current flows in the primary circuit which can be easily shielded.

In the switch-mode power supply constructed in accordance with the present invention, the switching transistor T1 is switched conductive for a predetermined period of time. Following this switch-on duration, i.e. during the blocked phase of the switching transistor T1, the transformer U is demagnetized. Following the demagnetization, and therefore in the currentless state of the free-wheeling diode D4, the switching transistor T1 is switched on again. Here, the end of the demagnetization is fundamentally recognized via the control winding W3.

Any controllable semiconductor switching element can be used as the switching transistor T1 in the switch-mode power supply constructed in accordance with the invention.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A switch-mode power supply comprising:
   a rectifier including an input for receiving a.c. voltage and an output for delivering d.c. voltage; and
   a free-running converter including a switching transistor, a transformer connected to said switching transistor, an output circuit, including a free-wheeling diode, connected to said transformer for delivering d.c. voltage, and control means connected to said transformer and to said switching transistor and operable to always switch on said switching transistor in the currentless state of said free-wheeling diode.

2. The switch-mode power supply of claim 1, wherein:
   said switching- transistor comprises a base, a collector and an emitter;
   a voltage divider is connected across said output of said rectifier and includes a tap connected to said base;
   said control means comprises a switch-on stage connected to said base and a switch-off stage connected to said base;
   said transformer comprises a control winding connected to said switch-on stage and to said switch-off stage and operable in response to demagnetization of said transformer to cause said switch-on stage switch on said switching transistor and after a predetermined interval to cause said switch-off stage to switch off said switching transistor in response to the current flow created by the voltage induced therein.

3. The switch-mode power supply of claim 2, wherein:
   said switch-on stage comprises a first resistor and a first capacitor connected in series between said control winding and said base of said switching transistor.

4. The switch-mode power supply of claim 3, wherein said switch-off stage comprises:
   a control transistor including a collector, an emitter and a base, said collector connected to said base of said switching transistor, said emitter connected to said output of said rectifier, a second resistor and a second capacitor connected in series between said control winding and said output of said rectifier and including a junction connected to said base of said control transistor.

5. The switch-mode power supply of claim 4, and further comprising:
   a diode connected in parallel with said second resistor for rapid discharge of said second capacitor at the beginning of demagnetization of said transformer.

* * * * *